(No Model.) 2 Sheets—Sheet 1.
A. GRIESEMER.
CORN AND SEED PLANTER.
No. 481,170. Patented Aug. 23, 1892.
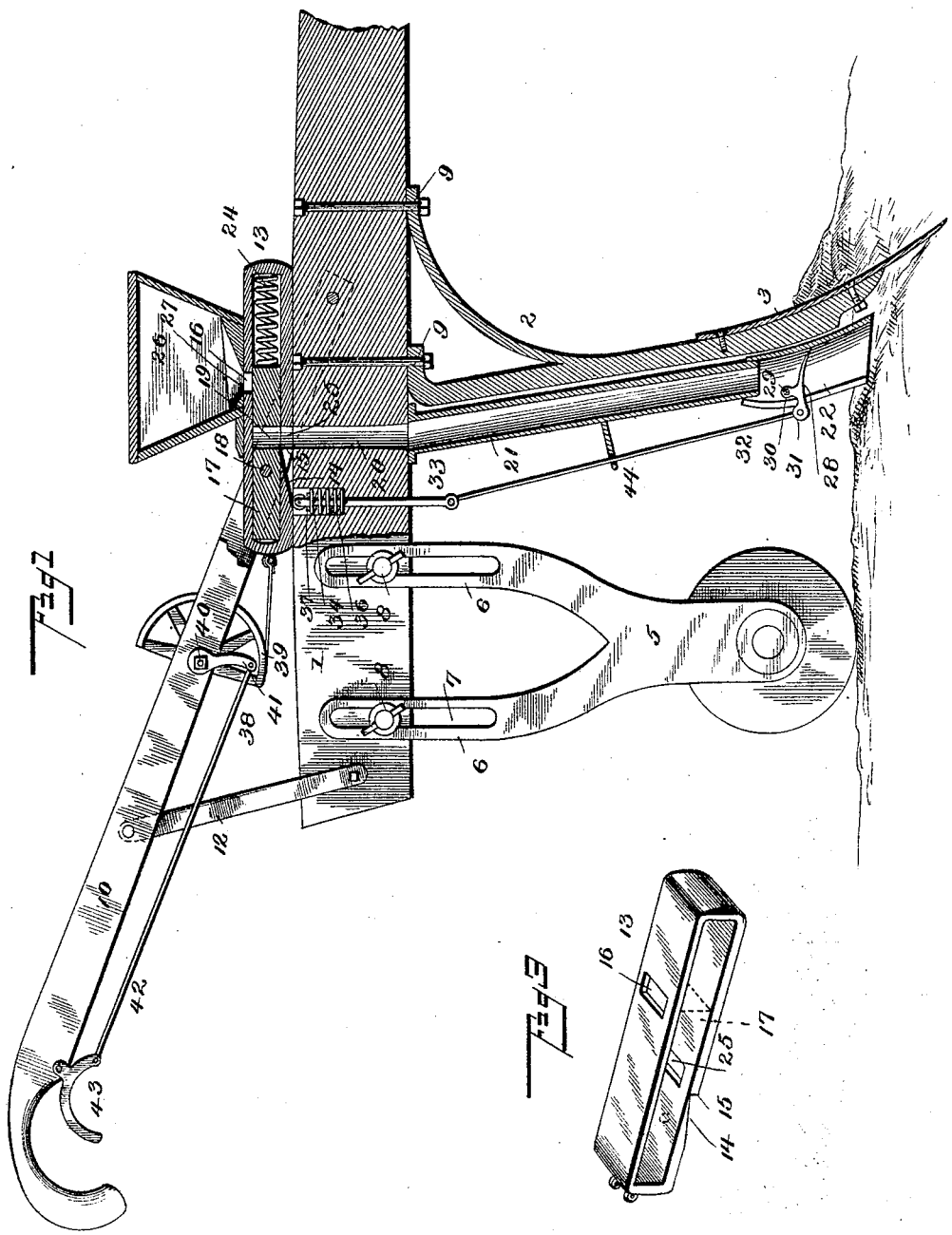
Witnesses
John Irivie
Alfred T. Gage
Inventor
Adam Griesemer,
By W. D. Henderson,
Attorney.

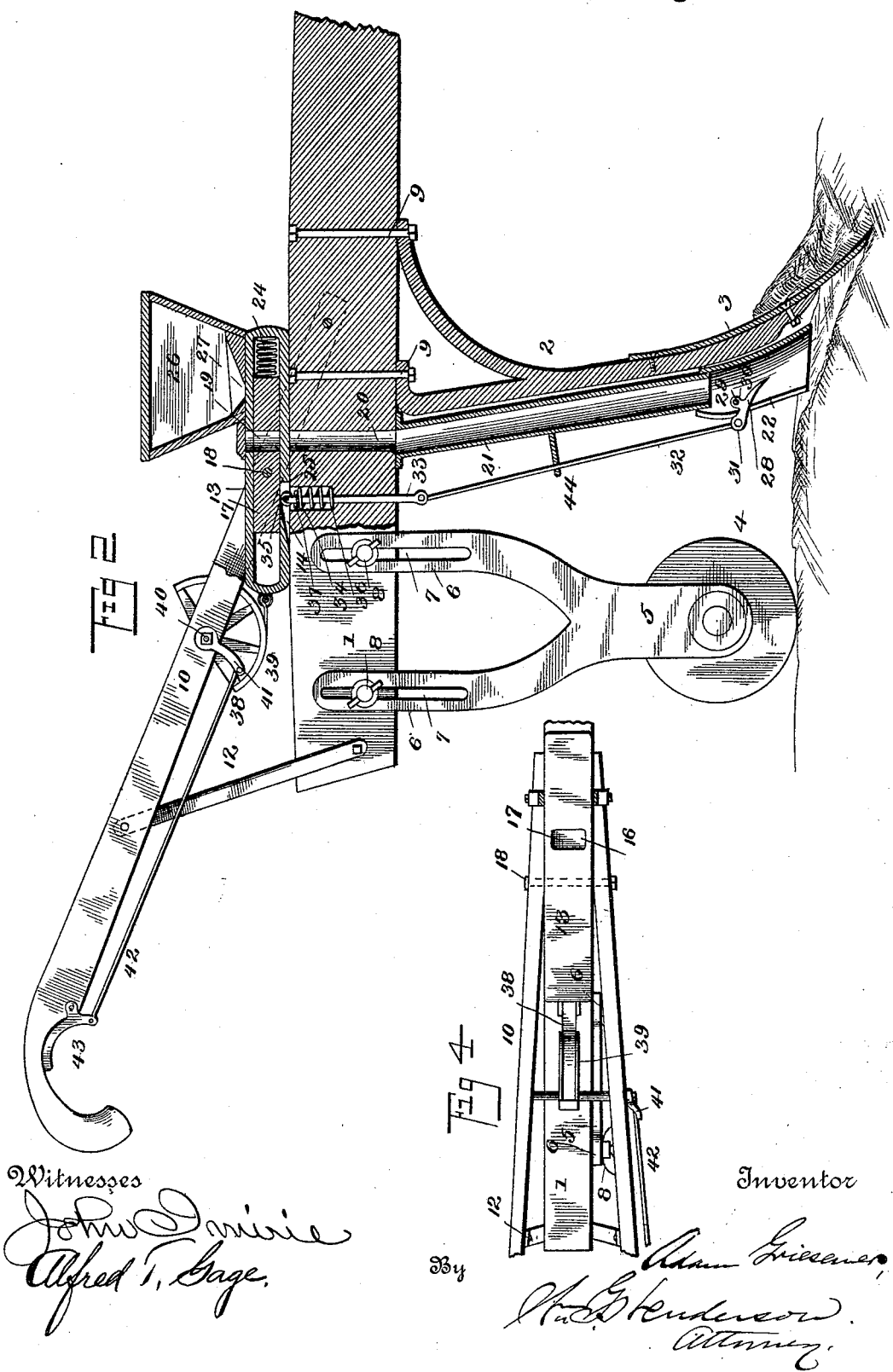

UNITED STATES PATENT OFFICE.

ADAM GRIESEMER, OF PUEBLO, COLORADO.

CORN AND SEED PLANTER.

SPECIFICATION forming part of Letters Patent No. 481,170, dated August 23, 1892.

Application filed December 2, 1891. Serial No. 413,792. (No model.)

*To all whom it may concern:*

Be it known that I, ADAM GRIESEMER, a citizen of the United States, residing at Pueblo, in the county of Pueblo and State of Colorado, have invented certain new and useful Improvements in Corn and Seed Planters; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to corn and seed planters, and has for its object the provision of an apparatus of that character capable of being managed by one person, and by which the soil may be furrowed to any desired depth and the corn or other seed dropped at any preferred intervals or any required points and immediately covered.

It is a further purpose of my invention to provide a seed and corn planter having a seed-slide provided with two independent openings, through which the seed passes successively and which coincide alternately with a passage in a rigid intermediate block to withdraw the seed from the hopper, deliver it to said passage, and finally from the latter to a seed-tube.

My invention also comprises an automatic seed-valve arranged in the seed-tube or in an appendage thereof and operated by the reciprocation of the seed-slide to open said valve at the moment when the passage from the hopper and from the intermediate block are both closed.

It is my purpose, also, to provide a corn-planter having a simple and inexpensive construction, which may be handled by any person without special skill or experience, which may be used for planting seed of any kind, large or small, by a simple and readily-effected change in one of the parts and which shall run with great ease upon any kind of soil, and by which corn or other seed may be planted with accuracy at any required depth and interval with great speed, thereby doing entirely away with manual labor other than that required for the control of the draft-animal and the periodical operation of the seed-dropping devices.

The invention consists in the several novel features of construction and new combinations of parts hereinafter fully set forth, and then more specifically pointed out and defined in the claims which conclude this specification.

To enable others skilled in the art to understand and to make, construct, and use my said invention, I will proceed to describe the same in detail, reference being had for such purpose to the accompanying drawings, in which—

Figure 1 is a vertical longitudinal section taken through a part of the beam and through the seed planting and dropping devices. Fig. 2 is a similar section taken through the same parts, which are shown in a different position. Fig. 3 is a detail perspective of the seed slide and dropper removed from the planter. Fig. 4 is a plan view of the planter, a portion of the handles and the forward and middle portion of the beam being broken away and the seed-hopper removed.

In the said drawings, the reference-numeral 1 indicates the beam of the corn-planter, to which is attached a hanger or bracket 2, upon which is mounted the plow or shovel 3, which is rendered adjustable to act at variable depths in the soil by means of the caster-wheel 4, which closely follows the plow. This wheel is journaled in a frame 5, having an upper forked extremity, the arms 6 of the latter being provided with longitudinal slots 7 to receive bolts 8, which are so constructed as to be operated by hand to lock the slotted arms 6 firmly against the side faces of the rearward end of the beam. By dropping or raising the caster-wheel in this manner the shovel or plow 3 may be caused to cut a furrow of any depth desired. The shovel is usually secured to the hanger or bracket 2 by means of a screw and bolt, as shown, and the hanger is attached to the beam by long bolts 9; but in these details I may substitute any other preferred construction. I preferably connect the handles 10 to the lateral faces of the beam by any familiar fastenings and brace said handles by bars 12, rising from the rearward extremity of the beam 1.

Upon the upper surface of the beam 1, lying between the handles 10 and extending longitudinally, is the seed-slide 13. (Shown detached in Fig. 3.) It consists of an open substantially rectangular frame formed of a flat strip or strips of suitable width and thickness, the length of said frame being considerably in excess of its depth. In the lower face of the lower side of this frame, at a little distance from its rear end, is formed an under-cut 14, terminating in a vertical shoulder 15. In the parallel upper member of the frame, between the forward end and a point in vertical line with the shoulder 15, is formed an opening 16, cut entirely through said member and of any required dimensions. The specific junctions of these parts will be explained hereinafter.

Within the frame 13 is arranged a block 17, having less length than the frame, but filling a portion of its length and its entire width throughout said longitudinal portion closely enough to prevent the entrance of seed between the two, but without obstructing the free longitudinal movement of said frame. The block 17 is rigidly fastened in place by a transverse bolt 18, engaging the lower end portions of the handles 10, and through its body is cut a vertical opening or passage 19, which coincides with a vertical passage 20, formed in the plow-beam. The lower end of this passage opens into the upper extremity of the seed-tube 21, which lies directly behind the hanger 3 and is extended downward until its open lower end is within a short distance of the ground. Upon the lower end of the seed-tube I mount a tubular guard 22, which extends downward to a point about upon a level with the soil or a little below the same, so that the seed may be delivered, if desired, within the furrow and below the top of the same.

Within the forward portion of the frame 13 is arranged a spiral spring 24, its ends resting against the end of the frame and the end of the block 17, whereby the frame or seed-slide is normally drawn forward until its movement is arrested by the rearward end of the block 17, as shown in Fig. 1. In this position an opening 25 in the lower side portion of the frame is brought into register or coincidence with the vertical opening 20 in the plow-beam and with the vertical opening or channel 19 in the block 17. When these three openings thus coincide to form a passage continuous with the seed-tube 21, the opening 16 in the upper member of the seed-slide will lie directly over the extreme forward end of the block 17, by which the lower side of said opening will be closed. Said opening 16 will in this position also lie beneath the seed-hopper 26, which is rigidly mounted on the beam, its bottom being cup-shaped and provided with an opening 27, which will coincide with the opening 16 when the parts are in the position last described.

Within the tubular guard 22 is arranged a seed-valve 28, pivoted upon a pin 29, which engages the end of an arm 30, projecting from a rearward lever-arm 31, which carries the valve. To this lever-arm is linked a rigid pitman-rod 32, suitably connected to a rod or bar 33, which lies in an opening in the plow-beam, its upper end rising into an enlarged recess or chamber 34, which opens through the upper surface of the plow-beam 1. This recess or chamber is so located that when the frame 13 is in its normal position, being carried by the spring 24 to its forward limit of movement, as seen in Fig. 1, the said chambers will lie beneath that portion of the frame 13 which is in rear of the under-cut 14. Upon the end of the rod or bar 33, which lies in the chamber 34, is journaled a roll or friction-wheel 35, which is pressed upward by a spring 36, coiled in the chamber 34 and exerting its force upon the under face of a collar or washer 37, rigidly mounted on the rod 33. The tension of this spring is sufficient to raise the rod with its connections and operate the seed-valve. By drawing the frame 13 toward the rear the friction-wheel 35 will roll upon its lower face and upon the upwardly-inclined face of the under-cut 14, which will permit the rod 33 to rise and operate the valve 28. The forward movement of the frame 13 is arrested when the forward end of the under-cut 14 reaches the friction-wheel, at which moment the seed-opening 16 in the upper member of the frame 13 will coincide with the vertical passage 19 in the block 17, as shown in Fig. 2, the entrance to the seed-opening 20 in the plow-beam being simultaneously closed by the imperforate portion of the lower member of the frame. It will be seen that by this construction the seed is first delivered from the hopper to the seed-opening 16 in the frame and while remaining in this opening the seed will lie on the upper surface of the block. From the latter it passes by the rearward movement of the slide or frame 13 to the vertical passage 19 in the block 17, and from this passage it is dropped by the forward movement of the frame 13 into the seed-opening 20 and seed-tube, where it is caught by the closed valve 28. This valve is opened by the subsequent rearward movement of the frame, as in Fig. 2, at which time both the hopper-bottom and the seed-passage 20 are closed.

By using seed-openings 16 of different dimensions, also, the apparatus may be used to plant seeds of different kinds and of any size, dropping the required quantity at each reciprocation of the seed-separator or frame 13. Motion is imparted to the latter by a flexible connection 38, attached to the rear end of the frame and to a segment-pulley 39, mounted upon an axis 40, supported in the handle-bars 10. Upon this axis is rigidly mounted a lever-arm 41, to the end of which is secured a connection 42, operated by a hand-lever 43, which is fulcrumed upon one of the plow-handles beneath the same, where the operator guiding the planter has convenient access to it without removing the hand.

I have shown a rigid connection between the seed-valve 28 and the rod 33, which is usually supported and guided by a bracket 44, projecting from the seed-tube.

It is evident that I may, without any substantial change, use a flexible connection, in which case it would be necessary to close the seed-valve by an independent spring instead of the downward thrust of the rod 32.

The simplicity of the construction shown and described renders the apparatus comparatively inexpensive in manufacture, easy in operation, and readily understood and operated by any person. It is completely under the control of the driver, who deposits the seed at his pleasure, the furrow being immediately filled and the soil impacted by the caster-wheel. The planter may be used upon any soil, and is capable of operating at any speed at which the horse can walk.

Having described my invention and set forth its merits, what I claim is—

1. In a corn and seed planter, the combination, with a suitable seed-hopper, of a seed-slide consisting of an open frame arranged longitudinally beneath the hopper and provided with a seed-opening in its upper member and an independent seed-opening in its lower and parallel member, a rigid block arranged in the frame and having a vertical seed-opening coinciding with a passage in the plow-beam, a spring arranged between the end of said block and the end of the frame and normally drawing said frame in one direction, and means for moving it in an opposite direction to cause the seed-opening in its upper member to coincide alternately with the opening in the hopper-bottom and with the vertical opening in the block and to cause the opening in the lower member to coincide with the passage in the block, and a passage in the beam at the moment the hopper or seed opening coincides with the opening in the upper bottom, substantially as specified.

2. In a corn and seed planter, the combination, with a rigid hopper having a discharge-opening in its bottom, of a seed-slide consisting of an open frame arranged to slide upon one of its sides upon the plow-beam, its lower side being provided with an under-cut and a seed-opening, and its upper side with a seed-opening, a rigid block filling a portion of said frame and having a seed-passage with which the openings in the frames alternately coincide, a seed-valve arranged in a seed-tube which communicates with a passage in the beam, a spring-actuated rod connected to the valve-lever, and having a friction-wheel riding on the frame and upon the inclined face of the under-cut therein, a spring moving the frame in one direction, and means for giving longitudinal movement thereto in an opposite direction, substantially as and for the purposes specified.

3. In a corn and seed planter, the combination, with a stationary hopper having a discharge-opening, of a seed-slide consisting of an open rectangular frame sliding upon one of its sides on the beam and directly beneath the hopper, a rigid block partly filling said open frame and having a vertical opening wherewith openings in the upper and lower members of the frame coincide alternately by the longitudinal movement of the frame, a spring arranged between the end of said block and the end of the frame, a seed-valve pivoted in a seed-tube communicating with a passage in the beam and with that in the block, a rod or bar lying in a seat in the beam and connected to the valve-lever, its head rising into a chamber in the beam beneath the frame, a friction-wheel journaled on said rod and bearing on the lower face of the frame, which is provided with an under-cut, a spring raising said rod, a lever pivoted on one of the handles and connected to an arm on a shaft behind the hopper, and a segment-pulley on said shaft having a flexible connection to the frame, substantially as and for the purposes specified.

4. In a corn and seed planter, the combination, with a seed-hopper, of a seed-slide consisting of two parallel connected parts sliding between the hopper and the beam, a block lying between said parts and having a passage which is caused by the longitudinal movement of the said parts to alternately coincide with the openings in the upper and lower parallel parts, respectively, a spring arranged between the end of said block and the end of the frame and moving said parts in one direction, and a hand-lever connected to said parts for imparting movement in the opposite direction, substantially as and for the purposes specified.

In testimony whereof I affix my signature in presence of two witnesses.

ADAM GRIESEMER.

Witnesses:
J. J. LANGDON,
JOS. THOMEN.